Figure 1:
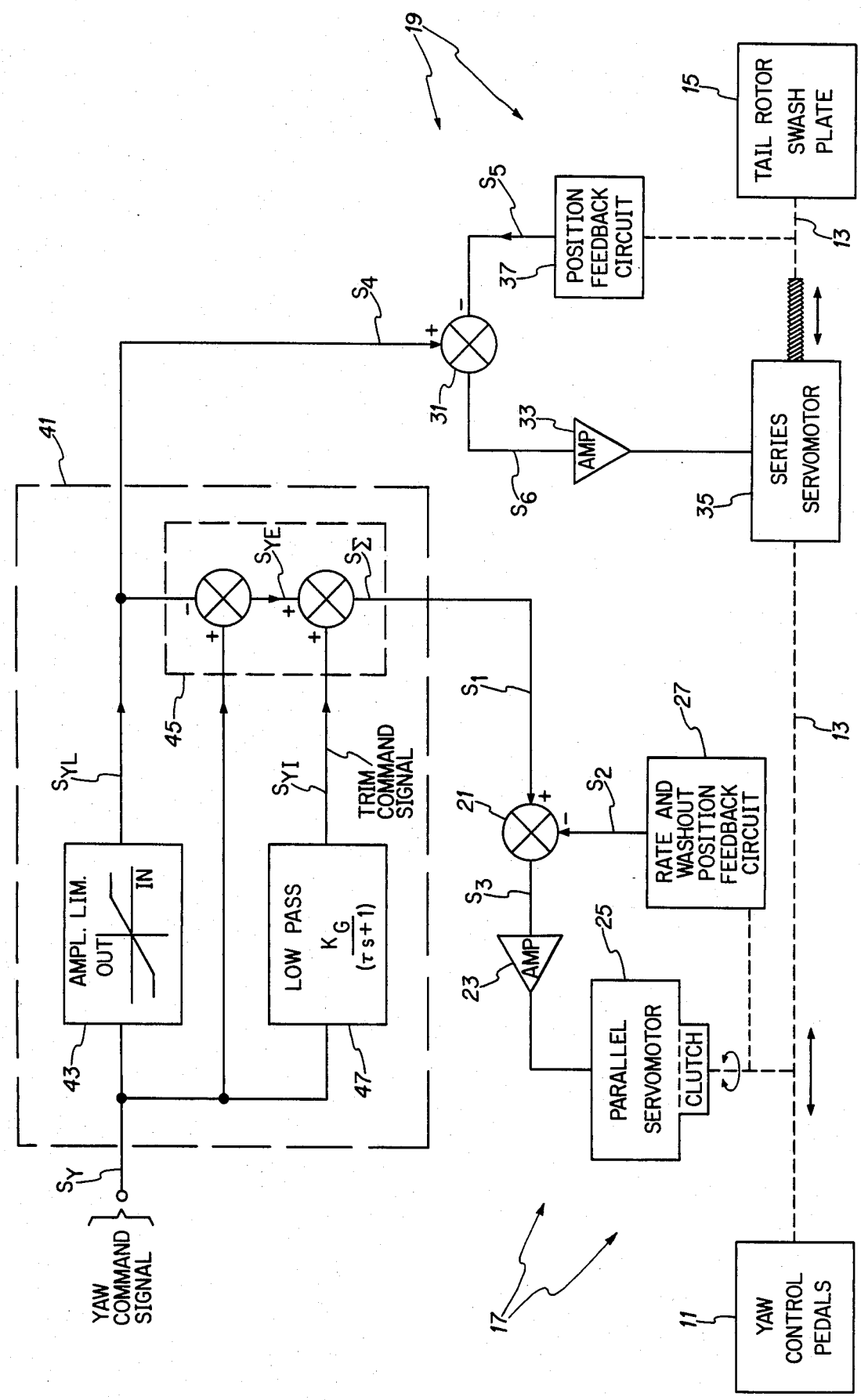

United States Patent [19]

Fabian et al.

[11] Patent Number: 4,492,907

[45] Date of Patent: Jan. 8, 1985

[54] COMBINED SERIES AND PARALLEL SERVO CONTROL FOR AIRCRAFT

[75] Inventors: Gordon R. Fabian; Kenneth W. McElreath, both of Cedar Rapids, Iowa

[73] Assignee: Rockwell International Corporation, El Segundo, Calif.

[21] Appl. No.: 393,166

[22] Filed: Jun. 28, 1982

[51] Int. Cl.³ ............................................. G05D 1/08
[52] U.S. Cl. .................... 318/586; 318/111; 318/626
[58] Field of Search ............ 318/586, 590, 580, 591, 318/111, 625, 575, 635, 626; 244/177, 178

[56] References Cited

U.S. PATENT DOCUMENTS

| | | | |
|---|---|---|---|
| 2,751,540 | 6/1956 | Lower | 318/591 |
| 3,123,324 | 3/1964 | Hammell | 318/580 X |
| 4,345,195 | 8/1982 | Griffith | 318/586 X |

*Primary Examiner*—J. V. Truhe
*Assistant Examiner*—Patrick C. Keane
*Attorney, Agent, or Firm*—Terry M. Blackwood; George A. Montanye; H. Fredrick Hamann

[57] ABSTRACT

A flight control system increases the automatic control authority over, preferably, a helicopter yaw axis. A limited authority series servo is complemented with a full authority parallel servo. The parallel servo is driven by a combination of a trim command signal and a signal representing the excess of the yaw command signal over the amplitude limited drive signal to the series servo.

16 Claims, 1 Drawing Figure

COMBINED SERIES AND PARALLEL SERVO CONTROL FOR AIRCRAFT

This invention relates to flight control systems for aircraft, and, in the preferred embodiments, for helicopter type aircraft.

As is well known in the art, helicopter flight and flight maneuvers are effected by controlling, collectively and/or cyclically, the pitch of the main rotor blades, and by controlling the pitch of the tail rotor blades. Rotor blade pitch change or control is effected through linkages in manual control devices, such as sticks and pedals, and/or to an automatic flight control apparatus such as an autopilot. The autopilot system, from data received from various sensors and on-board navigation systems, and in accordance with selected flight modes, generates commands (such as aircraft attitute hold and/or maneuver commands) and presents same to appropriate servo systems which in turn automatically effect the desired rotor pitch settings.

Typically, in aircraft automatic flight control systems where stability augmentation is desired for improved handling qualities, a series servo (either electromechanical or electrohydraulic) is employed as the control augmentation actuator. This actuator is limited in authority (on the order of ±10% of total control motion) in order to prevent the pilot from losing manual control authority in the event of an actuator failure in an extended position. The reason that a series servo is used is that the pilot should be able to interact with the control system and make inputs without feeling the high frequency motions of the servo.

For applications where full automatic control authority is required, a rate-limited parallel servo may be employed to slowly move the control "trim" position to retain aircraft control and allow the series servo to relax to its center position. Thus, the series servo has its full travel available for short-term gust alleviation or maneuvering. This complement of a dynamic series servo and a slow parallel servo performs adequately for many applications where large sudden automatic control inputs are not required. However, in some applications (for example, a helicopter yaw axis control system) it can be highly desirable to have a greater degree of dynamic response than the series servo can deliver and to have better performance than the slow moving rate-limited parallel trim servo can provide.

For examples of helicopter flight control, see U.S. Pat. Nos. 3,528,633, 3,921,966, and 4,182,238.

In accordance with the present invention, there is features the provision of the needed additional authority without compromising safety. Moreover, the pilot is instantly aware of the control position change and, thus, the amount of total aircraft control remaining.

These and other features, objects, and advantages of the invention will become more apparent upon reference to the following specifications, claims, and appended drawings in which:

FIG. 1 is a functional blockk diagram of the presently preferred embodiment as applied in a helicopter yaw control system.

In FIG. 1 there is shown in simplified fashion a yaw control system for a helicopter. Pilot moveable pedals 11 are coupled through a mechanical linkage system 13 (represented by dashed lines) to the yaw flight control surface (namely, the tail rotor and swash plate 15) whose repositioning, whether induced by pedals or actuator, produces appropriate changes in tail rotor blade pitch. The linkage system 13 may include a hydraulic booster (not shown) for providing a large mechanical advantage. Details of the mechanical linkage system are not shown but are found in the literature and are quite familiar to those skilled in the art.

As further represented in FIG. 1, two servosystems 17 and 19, in the automatic flight mode, (i) receive, respectively, signals $S_1$ and $S_4$, both of which are derived from yaw command signal $S_Y$ and (ii) automatically drive the linkage system 13 which in turn controls the swash plate position and thus the tail rotor blade pitch. Using the vernacular of the art, servo system 17 is connected to operate in parallel with linkage system 13, and servosystem 19 is connected to operate in series with linkage system 13.

Each of servosystems 17 and 19 individually is conventional. Briefly, parallel servosystem 17 comprises a summer 21, a high-gain amplifier 23, a servomotor 25, and a motor shaft sensing feedback circuit 27. Summer 21 receives the signal $S_1$ at a non-inverting input and also receives the feedback signal $S_2$ at an inverting input. Summer 21 outputs a corrective error signal $S_3$ which is equal to signal $S_1$ minus signal $S_2$. Error signal $S_3$ is amplified in amplifier 23 by a gain factor $\mu_1$ (typically 20 to 50) and amplified error signal $\mu_1 S_3$ is inputted to servomotor 25 and causes output shaft positional changes. The servomotor 25 output shaft, which is coupled to feedback circuit 27, causes feedback circuit 27 to produce a feedback signal $S_2$ appropriate to maintain corrective error signal $S_3$ substantially at zero.

Servomotor 25 includes a clutch at its output so that the manual control can override the motor control. The case or housing of servomotor 25 is stationary relative to the aircraft.

Series servosystem 19 comprises a summer 31, a high-gain amplifier 33, a servomotor 35, and a motor shaft sensing feedback circuit 37. Summer 31 receives the signal $S_4$ at a non-inverting input and also receives the feedback signal $S_5$ at an inverting input. Summer 31 outputs a corrective error signal $S_6$ which is equal to signal $S_4$ minus signal $S_5$. Error signal $S_6$ is amplified in amplifier 33 by a gain factor $\mu_2$ (typically 80 to 150) and amplified error signal $\mu_2 S_6$ is inputted to servomotor 35 and causes output shaft positional changes. The servomotor 35 output shaft which is coupled to feedback circuit 37 causes feedback circuit 37 to produce a feedback signal $S_5$ appropriate to maintain corrective error signal $S_6$ substantially at zero.

Series servomotor 35 is typically a screw type servomotor. The case or housing of series servomotor 35 is coupled directly with linkage 13 and moves along therewith relative to the aircraft. The series servomotor output screw moves relative to the series servomotor housing in accordance with the output of amplifier 33.

Circuit 27 is conventional and comprises a tachometer and washout circuit for providing a washout position feedback signal which, preferably, is rate damped. The washout circuit receives a motion-rate-representative signal from the tach, and for the short term provides, in response, an output much like that which an integrator would provide. After a short time (one to four seconds typically) following cessation of inut change, the washout circuit output begins to wash out; i.e., fade to zero. Such output is also rate damped by being summed with a rate component directly from the tach. Circuit 37 is conventional and comprises a position transducer suitable for providing a position feedback signal which does not wash out.

As represented in FIG. 1, signals $S_1$ and $S_4$ are derived from yaw command signal $S_Y$ by a deriver circuit 41. More particularly, circuit 41 comprises an amplitude limiter 43, a summer 45, and a low pass filter 47. Yaw command signal $S_Y$ is input to each of the limiter 43, the summer 45, and the low pass filter 57. The output signals $S_{YL}$ and $S_{YI}$, of the limiter 43 and low pass filter 47 respectively, are also input to the summer 45. Signals $S_Y$ and $S_{YI}$ are received at non-inverting inputs of summer 45, and signal $S_{YL}$ is received at an inverting input of summer 45. The output signal $S_{YL}$ of the limiter 43 is fed to summer 31 and is the same signal as hereinabove referred to as $S_4$. The output signal $S_\Sigma$ of the summmer 45 is fed to summer 21 and is the same signal as hereinabove referred to as $S_1$.

Low pass filter 47 is of conventional construction and has a transfer function whose Laplace transform is $K_G/(\tau s+1)$ where $K_G$ is a gain-representative constant and $\tau$ is a time constant. Time constant $\tau$ is equal to the position washout time constant of the servomotor washout position feedback circuit 27. The net effect of the two circuits 47 and 27 is an integration function having a Laplace transform of $K_G/\tau s$. The range of $\tau$ is typically two to five seconds.

Amplitude limiter 43 is also of conventional construction and has a transfer characteristic which may be described as follows:

$$S_{out}=K_0 S_{IN}, \text{ for } -K_1 < S_{IN} < +K_2;$$

$$|S_{out}| < |K_0 S_{IN}|, \text{ for } S_{IN} < +K_2, \text{ or } S_{IN} < -K_1;$$

where $S_{IN}$ is the limiter input signal and $S_{out}$ is the limiter output signal. More particularly, the transfer characteristic in the preferred embodiment may be additionally described as follows:

$K_0=1$; $K_1=K_2=$ a constant of predetermined value;

$$S_{out}=S_{IN}, \text{ for } -K_1 < S_{IN} < +K_1;$$

$$S_{out}=+K_1, \text{ for } S_{IN} < +K_1;$$

$$S_{out}=-K_1, \text{ for } S_{IN} < -K_1.$$

In particular yaw command signal employed is proportional to $[-\dot{\psi}-\Delta\psi]$, where $\dot{\psi}$ is yaw rate and $\Delta\psi$ is heading error.

The purpose of amplitude limiter 43 is to act as an authority limit. The limit of limiter 43 is set at a value less than the mechanical travel of the screw or output shaft of the series servomotor 35 so as to ensure proper operation and to prolong servomotor life.

One purpose of summer 45 is to effect the differencing of the limiter input signal and the limiter output signal. That is, the excess of yaw command signal $S_Y$ over limiter output signal $S_{YL}$ is a signal $S_{YE}$ which is one of the components of or contributors to signal $S_\Sigma$. The second contributor to signal $S_\Sigma$ is low pass filter 47 output signal $S_{YI}$ and thus a second purpose of summer 45 is to add signal $S_{YI}$ to the excess signal $S_{YE}$ so as to produce and output the signal $S_\Sigma=(S_{YI}+S_{YE})$.

When, for example, yaw control signal $S_Y$ changes from zero to a value within the linear range of limiter 43, the output of the limiter is the same as its input, and thus the immediate input to series servosystem 19 is essentially the yaw command signal $S_Y$ itself while the immediate input to parallel servosystem 17 (assuming that signal $S_{YI}$ is initially zero) is zero. That is, according to the assumed example, excess signal $S_{YE}$ is zero, trim command signal $S_{YI}$ is zero, and thus signal $S_\Sigma=S_1$ is zero. Under such conditions, the near term or dynamic response of series servomotor 35 is an output shaft movement sufficient to move swash plate 15 to the commanded position, and moreover, there is no immediate response of parallel servomotor 25. After several seconds, signal $S_{YI}$ builds up to a level whereby parallel servomotor 25 response is to maintain, by itself, the commanded swash plate position. At such time where the parallel servomotor has completely taken over the job of maintaining the commanded swash plate position, the yaw command signal $S_Y$ has returned to zero and the series servomotor output has returned to its centered position.

As a second example of system operation, assume that yaw command signal $S_Y$ rather quickly changes from zero to a large positive value greater than $+K_2$. Further assume that trim command signal $S_{YI}$ is zero at this time. In the brief instant before the servomotors can start to respond, the limiter output signal $S_{YL}$, namely the servosystem 19 input signal $S_4$, is $+K_2$, and the output signal $S_\Sigma$ of summer 45, namely the input signal $S_1$ to parallel servosystem 17, is equal to $S_Y-K_2$. In other words, the immediate value of the excess signal $S_{YE}$ is $(S_Y-K_2)$, and since the trim command signal is assumed initially to be zero then the summer 45 output signal $S_\Sigma$ is merely equal to the excess signal $S_{YE}$. Series servomotor 35 responds quickly, its output shaft quickly moving to its limit so as to effect its part of the total swash plate displacement required to achieve the newly commanded position. The parallel servomotor 25 also quickly responds, its output shaft quickly moving to effect the balance of the swash plate displacement needed to achieve the newly commanded position. The correct and commanded amount of swash plate deflection results from the mechanical summing effect of the motions of the two servomotor actuators 25 and 35. It should be noted that the parallel servomotor 25 moves immediately or dynamically only if the series servo command limit is exceeded or saturated.

Continuing with the last posed example, trim command signal $S_{YI}$ (being the output of a low pass filter) will slowly increase to a level where it totally takes over the control of the swash plate position (via the parallel servosystem) and allows yaw command signal $S_Y$ to return to zero thereby effecting a recentering of the series servomotor 35. In other words, assuming no further changes, trim command signal $S_{YI}$ will eventually build up to a level sufficient to cause parallel servomotor 25 to effect all the swash plate deflection necessary for it to maintain the commanded swash plate position. At such time, the yaw command signal $S_Y$ has returned to zero and the series servomotor 35 has been caused to return to its center position.

The above described control system may also be applied to the roll, pitch, and/or collective control systems of a helicopter, and may involve flight control surfaces other than that for yaw. Also, it may be used in corresponding controls of other aircraft. Also, system safety may be enhanced by using dual, fail-passive yaw command computations and servo electronic drive circuitry. Such fail-passive design and electronic limiting is well known in the art.

Thus, while embodiments have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. For use in an aircraft having (a) an autopilot for providing one or more flight control command signals and (b) a manually operable device mechanically coupled through appropriate linkages to a flight control surface so as to afford positioning of said surface, the apparatus comprising:
   (1) servomotor first means connected to said linkages so as to operate in series with said manually operable device;
   (2) second means connected to said first means output for providing a feedback first signal;
   (3) third means for receiving said feedback first signal and a control first signal and producing therefrom a corrective error first signal which causes the servomotor first means output position to change so as to maintain said corrective error first signal substantially at zero;
   (4) servomotor fourth means connected to said linkages so as to operate in parallel with said manually operable device;
   (5) fifth means connected to fourth means output for providing a feedback second signal;
   (6) sixth means for receiving said feedback second signal and a control second signal and producing therefrom a corrective error second signal which causes the servomotor fourth means output position to change so as to maintain said corrective error second signal substantially at zero; and
   (7) seventh means for (a) receiving a predetermined autopilot generated command signal and (b) providing as output said control first signal and said control second signal such that said control first signal comprises a signal indicative of output signal of an amplitude limiter whose input signal is said autopilot generated command signal, and such that said control second signal comprises a signal indicative of excess of said autopilot generated command signal over a predetermined reference.

2. Apparatus as defined in claim 1 wherein said predetermined reference is said control first signal.

3. Apparatus as defined in claim 2 wherein said control second signal includes a further signal, namely, a trim command signal.

4. Apparatus as defined in claim 3 wherein said trim command signal comprises a signal indicative of the output of a low pass filter whose input is said autopilot generated command signal.

5. Apparatus as defined in claims 1, 2, 3, or 4 wherein said control first signal comprises an amplitude limited signal where p1 (i) said amplitude limited signal is substantially equal to a predetermined product when said autopilot generated command signal is within a range bounded by a first predetermined constant and a second predetermined constant, said product equalling a third predetermined constant times said autopilot generated command signal, said first and second constants having opposite algebraic signs, and
   (ii) said amplitude limited signal is less than said product when said autopilot generated command signal is outside said range.

6. Apparatus as defined in claim 5 wherein said amplitude limited signal is substantially equal to the appropriate one of said first constant or said second constant when said autopilot generated command signal is outside said range.

7. Apparatus as defined in claim 6 wherein said first constant and said second constant are valued such that if both said constants had the same algebraic sign, said constants would be substantially equal to one another.

8. Apparatus as defined in claim 7 wherein said third constant is substantially equal to 1.

9. Apparatus as defined in claims 1, 2, 3, or 4 wherein said feedback first signal is a position feedback signal and said feedback second signal is a washout position feedback signal.

10. Apparatus as defined in claim 9 wherein said control first signal comprises an amplitude limited signal where
    (i) said amplitude limited signal is substantially equal to a predetermined product when said autopilot generated command signal is within a range bounded by a first predetermined constant and a second predetermined constant, said product equalling a third predetermined constant times said autopilot generated command signal, said first and second constants having opposite algebraic signs, and
    (ii) said amplitude limited signal is less than said product when said autopilot generated command signal is outside said range.

11. Apparatus as defined in claim 10 wherein said amplitude limited signal is substantially equal to the appropriate one of said first constant or said second constant when said autopilot generated command signal is outside said range.

12. Apparatus as defined in claim 11 wherein said first constant and said second constant are valued such that if both said constants had the same algebraic sign, said constants would be substantially equal to one another.

13. Apparatus as defined in claim 12 wherein said third constant is substantially equal to 1.

14. For use in an aircraft having (a) an autopilot for providing one or more flight control command signals and (b) a manually operable device mechanically coupled through appropriate linkages to a flight control surface so as to afford positioning of said surface, the apparatus comprising:
    (1) servomotor first means connected to said linkages so as to operate in series with said manually operable device;
    (2) second means connected to said first means output for providing a feedback first signal;
    (3) third means for receiving said feedback first signal and a control first signal and producing therefrom a corrective error first signal which causes the servomotor first means output position to change so as to maintain said corrective error first signal substantially at zero;
    (4) servomotor fourth means connected to said linkages so as to operate in parallel with said manually operable device;
    (5) fifth means connected to fourth means output for providing a feedback second signal;
    (6) sixth means for receiving said feedback second signal and a control second signal and producing therefrom a corrective error second signal which causes the servomotor fourth means output position to change so as to maintain said corrective error second signal substantially at zero;
    (7) seventh means comprising an amplitude limiter connected to receiving a predetermined autopilot generated signal and providing in response thereto the control first signal; and (8) eighth means comprising summing means connected for receiving said autopilot generated signal and said control first signal and providing a difference indicative signal substantially proportional to the difference between said autopilot generated signal and said control first signal, said difference indicative signal being at least one component of the control second signal.

15. Apparatus as defined in claim 14 and further including low pass filter ninth means connected for receiving said autopilot generated signal and for providing output signal to said eighth means, said eighth means effecting addition of said difference indicative signal and said ninth means provided output signal and having output connected such that said control second signal comprises said difference indicative signal plus said ninth means provided output signal.

16. Apparatus as defined in claims 14 or 15 wherein said feedback first signal is a position feedback signal and said feedback second signal is a washout position feedback signal.

* * * * *